(12) United States Patent
Spector et al.

(10) Patent No.: US 12,062,045 B2
(45) Date of Patent: Aug. 13, 2024

(54) SYSTEMS AND METHODS FOR VERIFIED COMMUNICATION BETWEEN MOBILE APPLICATIONS

(71) Applicant: JPMORGAN CHASE BANK, N.A., New York, NY (US)

(72) Inventors: Howard Spector, Street, MD (US); Scott H Ouellette, Kingston, NH (US); Dave Carey, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 266 days.

(21) Appl. No.: 17/664,136

(22) Filed: May 19, 2022

(65) Prior Publication Data

US 2023/0376953 A1 Nov. 23, 2023

(51) Int. Cl.
*H04L 67/53* (2022.01)
*G06Q 20/32* (2012.01)
*G06Q 20/40* (2012.01)

(52) U.S. Cl.
CPC ....... *G06Q 20/4014* (2013.01); *G06Q 20/326* (2020.05); *H04L 67/53* (2022.05)

(58) Field of Classification Search
None
See application file for complete search history.

(56) References Cited

U.S. PATENT DOCUMENTS

| | | | |
|---|---|---|---|
| 9,148,453 B1* | 9/2015 | Pankajakshan | H04L 65/1076 |
| 2016/0226963 A1* | 8/2016 | Forsberg | H04L 67/56 |
| 2023/0162187 A1* | 5/2023 | Rule | G06F 40/174 |
| | | | 705/44 |

* cited by examiner

*Primary Examiner* — Craig C Dorais
(74) *Attorney, Agent, or Firm* — GREENBERG TRAURIG LLP

(57) ABSTRACT

Systems and methods for establishing trust between a conventional mobile application and a micro application are disclosed. In accordance with aspects, a method may include authenticating user credentials with a backend processing infrastructure of a provider of a mobile application, wherein the authenticating generates session information; receiving, at the mobile application, a uniform resource identifier (URI), wherein the URI includes the session information as a parameter of the URI; receiving, at the mobile application, a user-activation of the URI; receiving, at the backend processing infrastructure of the provider of the mobile application and from a backend processing infrastructure of a third party, the session information; verifying, by the backend processing infrastructure of the provider of the mobile application the session information; and sending, by the backend processing infrastructure of the provider of the mobile application and to the backend processing infrastructure of the third party, requested user information.

20 Claims, 8 Drawing Sheets

SYSTEMS AND METHODS FOR VERIFIED COMMUNICATION BETWEEN MOBILE APPLICATIONS

RELATED APPLICATIONS

This application is related to patent application Ser. No. 17/664,136, filed May 19, 2022, entitled SYSTEMS AND METHODS FOR VERIFIED COMMUNICATION BETWEEN MOBILE APPLICATIONS, and having, the disclosure of which is hereby incorporated by reference in its entirety.

BACKGROUND

1. Field of the Invention

Aspects are generally related to systems and methods for verified communication between mobile applications.

2. Description of the Related Art

Mobile device platforms continue to refine the manner in which a mobile device user can interact with mobile applications. One example of this is the relatively frictionless way that micro applications can be seamlessly downloaded and launched via an invocation made by a user from, e.g., a conventional mobile application or a website. Despite these advances and the business opportunities they offer partner organizations, sharing user associated data between mobile application platforms still poses challenges, including authentication, verification, and trust challenges.

SUMMARY

In some aspects, the techniques described herein relate to a method, including: authenticating user credentials with a backend processing infrastructure of a provider of a mobile application, wherein the authenticating generates session information; receiving, at the mobile application, a uniform resource identifier (URI), wherein the URI includes the session information as a parameter of the URI; receiving, at the mobile application, a user-activation of the URI; receiving, at the backend processing infrastructure of the provider of the mobile application and from a backend processing infrastructure of a third party, the session information; verifying, by the backend processing infrastructure of the provider of the mobile application the session information; and sending, by the backend processing infrastructure of the provider of the mobile application and to the backend processing infrastructure of the third party, requested user information.

In some aspects, the techniques described herein relate to a method, wherein the URI includes a third-party identifier as a second parameter of the URI, wherein the third party identifier identifies the third party.

In some aspects, the techniques described herein relate to a method, wherein the mobile application sends the third-party identifier to a mobile device operating system.

In some aspects, the techniques described herein relate to a method, wherein the mobile device operating system downloads and launches a micro-application provided by the third party.

In some aspects, the techniques described herein relate to a method, further including: completing, by the backend processing infrastructure of the third party, an action using the requested information.

In some aspects, the techniques described herein relate to a method, further including: sending, by the backend processing infrastructure of the third party, a notification to the micro-application, wherein the notification indicates that the action has been completed.

In some aspects, the techniques described herein relate to a method, wherein the session information includes a username.

In some aspects, the techniques described herein relate to a method, wherein the requested user information includes an address associated with the user credentials.

In some aspects, the techniques described herein relate to a method, wherein the requested user information includes payment information associated with the user credentials.

In some aspects, the techniques described herein relate to a method, wherein the session information is received by the backend processing infrastructure of the provider of the mobile application via an API call to an external API gateway exposed by the backend processing infrastructure of the provider of the mobile application.

In some aspects, the techniques described herein relate to a method, wherein the session information is hashed.

In some aspects, the techniques described herein relate to a method, wherein the session information is hashed using a SHA-2 algorithm.

In some aspects, the techniques described herein relate to a non-transitory computer readable storage medium, including instructions stored thereon, which when read and executed by one or more computers cause the one or more computers to perform steps including: authenticating user credentials with a backend processing infrastructure of a provider of a mobile application, wherein the authenticating generates session information; receiving, at the mobile application, a uniform resource identifier (URI), wherein the URI includes the session information as a parameter of the URI; receiving, at the mobile application, a user-activation of the URI; receiving, at the backend processing infrastructure of the provider of the mobile application and from a backend processing infrastructure of a third party, the session information; verifying, by the backend processing infrastructure of the provider of the mobile application the session information; and sending, by the backend processing infrastructure of the provider of the mobile application and to the backend processing infrastructure of the third party, requested user information.

In some aspects, the techniques described herein relate to a non-transitory computer readable storage medium, wherein the URI includes a third-party identifier as a second parameter of the URI, wherein the third party identifier identifies the third party.

In some aspects, the techniques described herein relate to a non-transitory computer readable storage medium, wherein the mobile application sends the third-party identifier to a mobile device operating system.

In some aspects, the techniques described herein relate to a non-transitory computer readable storage medium, wherein the session information includes a username.

In some aspects, the techniques described herein relate to a non-transitory computer readable storage medium, wherein the requested user information includes an address associated with the user credentials.

In some aspects, the techniques described herein relate to a non-transitory computer readable storage medium, wherein the requested user information includes payment information associated with the user credentials.

In some aspects, the techniques described herein relate to a non-transitory computer readable storage medium, wherein the session information is received by the backend processing infrastructure of the provider of the mobile application via an API call to an external API gateway exposed by the backend processing infrastructure of the provider of the mobile application.

In some aspects, the techniques described herein relate to a system comprising a backend processing infrastructure of a provider of a mobile application and a mobile device that executes the mobile application; wherein the backend processing infrastructure of the provider of the mobile application is configured to authenticate user credentials, and wherein the authentication of the user credentials generates session information; wherein the mobile application is configured to receive a uniform resource identifier (URI), wherein the URI includes the session information as a parameter of the URI; receive a user-activation of the URI; and wherein the backend processing infrastructure of the provider of the mobile application is further configured to receive, from a backend processing infrastructure of a third party, the session information; verify the session information; and send, to the backend processing infrastructure of the third party, requested user information.

DETAILED DESCRIPTION

Aspects are generally related to systems and methods for verified communication between mobile applications.

In accordance with aspects, micro-applications (referred to herein as "micro apps") can be used to facilitate secure, authenticated, seamless and streamlined data transfers between the technology systems of business partners. A micro-application, or micro app, as used herein refers to a lightweight application, or portion of a larger application, that has been specifically developed to be quickly acquired, and its functionality quickly accessed, by a user. Micro apps can be a "light" version of a more robust (but heavier in terms of size, download time, required processing power, etc.) conventional application. Micro apps can provide a portion of the native experience of a corresponding full (i.e., conventional) application without the user explicitly installing the corresponding full application on a mobile device. Examples of micro apps include applications developed as an Apple® App Clip or an Android® Instant App.

Because of their emphasis on speed of attainment and usage, micro apps are generally smaller in size and complexity then a conventional application. A micro app is generally limited in functionality as compared with a conventional mobile application. In fact, by definition, a micro app can be limited in its overall storage size, development frameworks it can employ, background activity that it can perform, data that it can share and process, etc. An advantage of a micro app, however, is near instantaneous discoverability and usage of a limited set of features by mobile users. A micro app does not require a user to go to an application library, download an application, create a user account, set permissions, etc., etc.

A micro app can be associated with and developed to provide a particular action item to the user. Limiting the action provided by a micro app to a single action, or relatively few actions, helps developers meet size restrictions that may be place on micro apps. For instance, a micro app developed for a hotel can offer a reservation or check-in action; a micro app for a retailer may offer an action to order/purchase a particular item; etc.

In accordance with aspects, micro apps can be launched from other applications. For instance, a micro app can be launched from a mobile browser, from another (conventional) application, from a SMS message or other instant message, from a mapping application, from a QR code reader, etc. In accordance with aspects, a uniform resource identifier (URI) (such as a uniform resource locator (URL)) can be used to reference and invoke a micro app. An invocation URI can be embedded in a conventional mobile application (also referred to herein as a "mobile app") and can be activated (e.g., "clicked") by a mobile device user. The mobile operating system (OS) can verify the publisher of the micro app and once verified, can launch the micro app.

Figure 1:
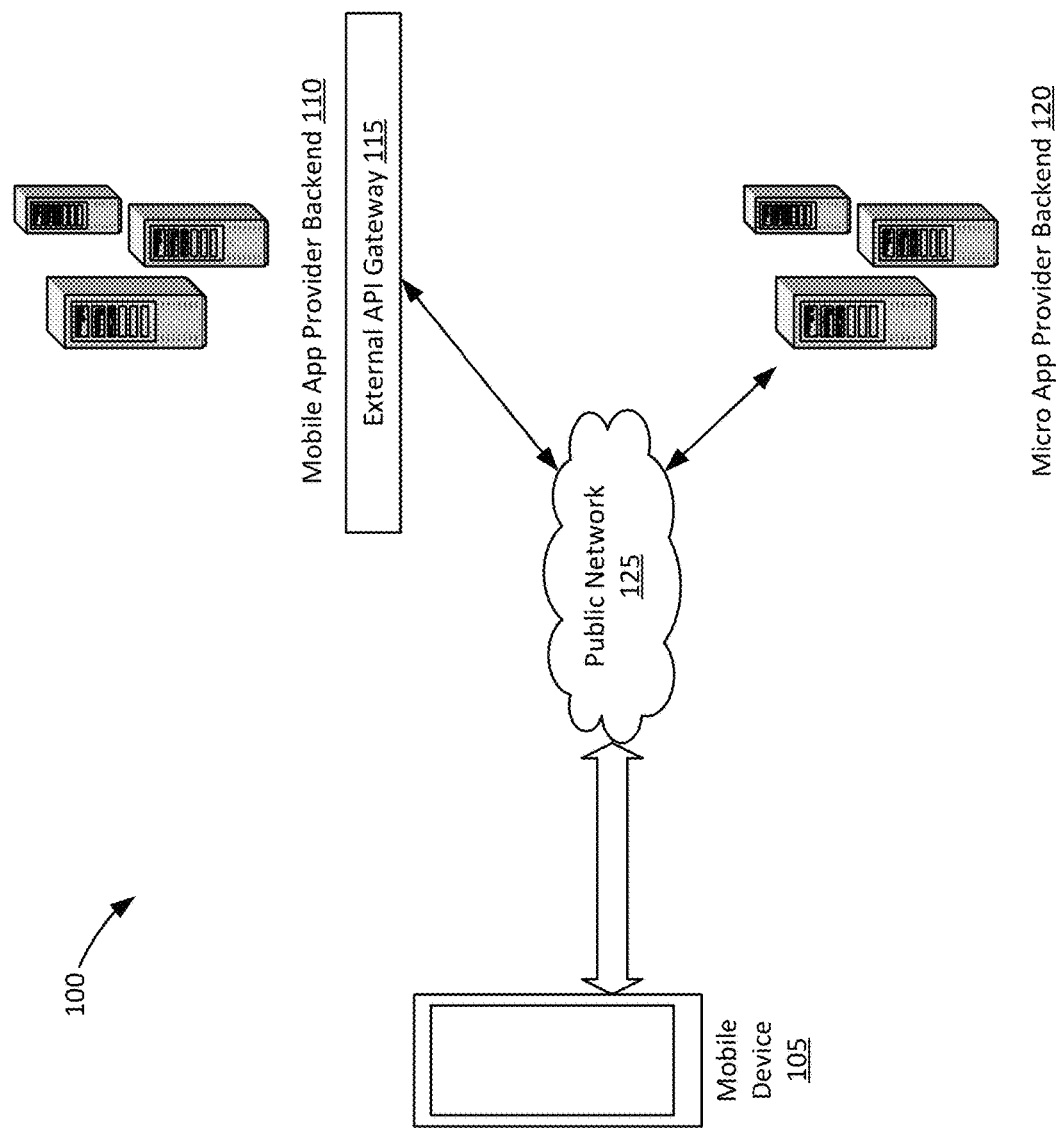
FIG. 1 is a block diagram of a system for facilitating verified communication between mobile applications, in accordance with aspects.

FIG. 1 is a block diagram of a system for facilitating verified communication between mobile applications, in accordance with aspects. System 100 includes mobile device 105, mobile app provider backend 110 and micro app provider backend 120. Additionally, system 100 includes external API gateway 115 and public network 125.

Mobile device 105 can be a smart phone, a tablet computer, a laptop computer, or any mobile electronic device that is capable of storing and executing a mobile application and/or a micro app.

Mobile app provider backend 110 and micro app provider backend 120 represent the backend technology infrastructures of different organizations. These infrastructures include servers, computers, software applications, computer network mediums, and computer networking hardware and software for providing electronic services based on computer software applications executing on requisite hardware. Exemplary hardware and software include webservers, application servers, communication servers such as email servers and SMS servers, network routers, switches and firewalls, custom-developed software applications including hardware to execute them on, etc.

External application programming interface (API) gateway 115 can be a partner API that requires access rights from mobile app provider backend 110 in order for access. External API gateway 115 can be accessible to partner organizations via a public network (e.g., the Internet). External API gateway 115 can be based on any suitable API architecture. Exemplary API architectures and/or protocols include SOAP (Simple Object Access Protocol), XML-RPC, REST (Representational State Transfer), or the like.

Mobile device 105, mobile app provider backend 110 (including External API gateway 115), and micro app provider backend 120 can each be communicatively coupled to public network 125 with appropriate hardware and software. For instance, mobile device 105 can include a wired or wireless network interface card (NIC) that interfaces with public network 125 and is configured with appropriate communication protocols. Likewise, mobile app provider backend 110 and micro app provider backend 120 can include hardware (NICs, switches, routers, etc.) configured with appropriate protocols for intercommunication with each other and with mobile device 105 over public network 125.

In accordance with aspects, a mobile application can display, for user selection, a URI referencing a third party's mobile application and/or micro app. The third party can be, e.g., a business partner of the mobile app provider. The URI can be generated with included parameter values. The parameter values can be based on a mobile user's user credentials and/or other session information from the user's current session stored at a webserver, application server, or other server of the mobile app provider's backend processing/storage infrastructure. In order to advance security, the combined or individual parameter values can be hashed using a hashing algorithm to create a hash value, and the hash value (or values) can be sent as the parameter(s) of the URI. Any industry standard hashing algorithm may be used. Exemplary hashing algorithms include MD5, SHA-2 (e.g., SHA-256, SHA-384, SHA-512) algorithms, etc.

When activated from the mobile app, the URI can launch a micro app provided by the third party. The micro app can retrieve the one or more parameters from the URI and forward them to the backend processing infrastructure of the third-party provider of the micro app.

Once received at the backend processing systems of the micro app provider, appropriate servers at the micro app provider backend can make an API call to an external-facing API partner gateway published by the mobile app provider. The API call can include the received parameter(s), which originated at a server of the mobile app provider (for example, a webserver, an application server, etc.). The API call can be sent to the mobile app provider via a secure channel, such as an OAUTH 2.0 (or similar) protected link. The external-facing API partner gateway, or another authentication service, can authenticate the micro app provider's API call as originating from an authorized partner using AUTH 2.0 or a similar authentication protocol.

Once received, an authentication service can validate the received parameters. If the parameters are not encrypted, they can be compared to their original values. If the parameter is a hash value or values, the authentication service can create one or more corresponding hash values from the original values and compare the received and created hash values. If the parameter value or values match, then the mobile application user and context is authenticated.

Once the mobile application user and the user context are authenticated, the mobile application provider can send information pertaining to the mobile application user to the micro app provider's systems. Any data that is necessary or desirable to complete or complement an action initiated by the user's interaction with the micro app, and that is stored by the mobile app provider, can be sent to the micro app provider's backend processing systems via a response to the API call. The user data can be demographic, such as name and address, or it can be other types of data. For instance, tokenized payment information (e.g., credit card payment information) can be sent to the micro app provider, if a transaction was initiated by the user's engagement with the micro app.

Figure 2:
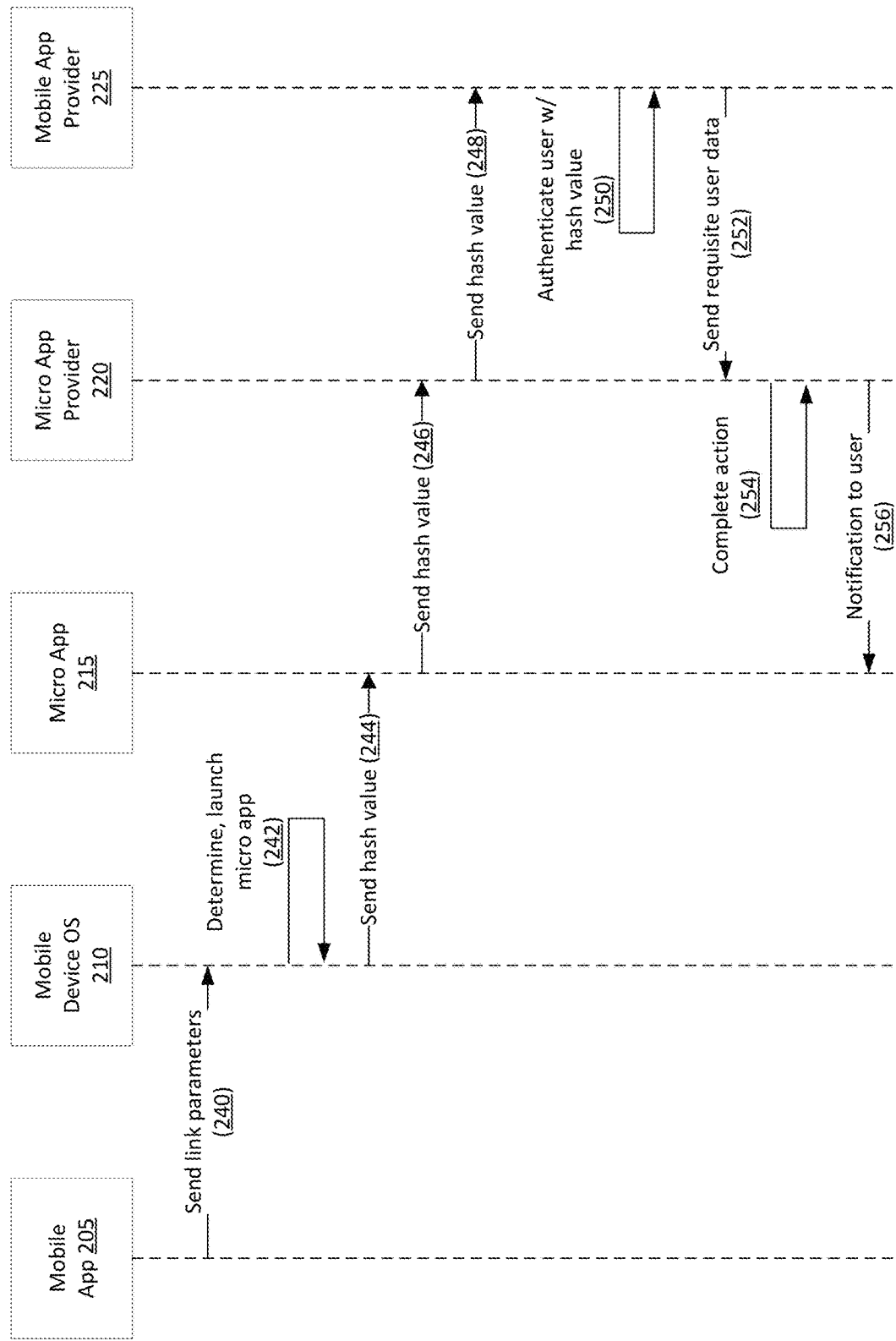
FIG. 2 is a sequence diagram for verified communication between a conventional mobile application and a micro application, in accordance with aspects.

FIG. 2 is a sequence diagram for verified communication between a conventional mobile application and a micro application, in accordance with aspects. At step 240, in response to activation of a URI link displayed in a mobile application by a user, mobile app 205 can send link parameters embedded in the URI to mobile device OS 210. As noted above, mobile device OS 210 can determine, based on, e.g., an identification of a third party in a link parameter, any resources that are available from the third party to the mobile device user.

At step 242, mobile device OS 210 can determine that a micro app provided by the third party referenced in the URI is available for use. Mobile device OS 210 can download and launch the micro app provided by the third party. The micro app can provide an action for the user and may be displayed as partially overlaying the mobile app from which the link was activated. The action may require demographic, payment, or other information about the user that the third party does not have.

At step 244, mobile device OS 210 can send the hash value received as a link parameter to micro app 215. At step 246, micro app 215 can send the hash parameter to the backend processing system of micro app provider 220. Micro app 215 can also send other data to micro app provider 220. For instance, micro app 215 may send information regarding the action provided to the mobile device user. For instance, if the action is a transaction between the mobile device user and micro app provider 220, micro app 215 can send details of the transaction to micro app provider 220.

In accordance with aspects, micro app provider 220 may need information about or related to the user in order to process the action provided by micro app 215. For instance, if the action is a transaction involving delivery of a good in exchange for a monetary payment, micro app provider 220 may need demographic information about the user, such as the user's name and mailing address. Additionally, micro app provider 220 may need the user's payment information, such as a credit card payment information, in order to complete the transaction. Because the micro app is downloaded and accessible rapidly after the user activates the URI link, however, micro app provider 220 may not be in possession of the information needed to complete the action provided by the micro app.

With continued reference to FIG. 2, micro app provider 220 can send the hash value to mobile app provider 225's backend processing systems at step 248. This can be done, e.g., via an API call to a partner API gateway. Once received, mobile app provider 225 can authenticate the mobile device user as a customer of mobile app provider 225. Mobile app provider 225 can compare a stored hash value of the session context information with the hash value received at step 248. If the hash values match, it can be determined that the user of mobile app 205 activated the link to micro app 215. Upon authentication, mobile app provider 225 can prepare the requisite data for completion of the action provided by micro app 215.

In accordance with aspects, mobile app provider 225 can determine what user data is needed in any suitable manner. For instance, mobile app provider 225 may receive an indication of the information that is needed in order to complete the action as parameters of an API call to a partner API gateway. In other aspects, an action code that is associated with the action provided by micro app 215 can be sent from micro app provider 220 to mobile app provider 225. The action code can act as a lookup key that mobile app provider 225 can use to find return information that will allow micro app provider 220 to complete the action/transaction.

At step 252, mobile app provider 225 can send the data that has been determined as requisite data to complete the action to micro app provider 220. The action can be completed at step 254, and at step 256, the user can be notified of completion through the micro app interface.

In accordance with aspects, micro app provider 220 can create a local account for the mobile app user based on the information received from mobile app provider 225. Further, the local account information for use with micro app provider 220 can be returned to micro app 215/mobile device os 210 and stored in a local or cloud-based password manager or other user credential repository of mobile device OS 210. In this way, if the device user downloads and installs a conventional mobile application from micro app provider 220, the mobile user's user credential information can be populated in the correct application fields, thereby reducing setup and access time when installing micro app provider 220's conventional application.

Figure 3:
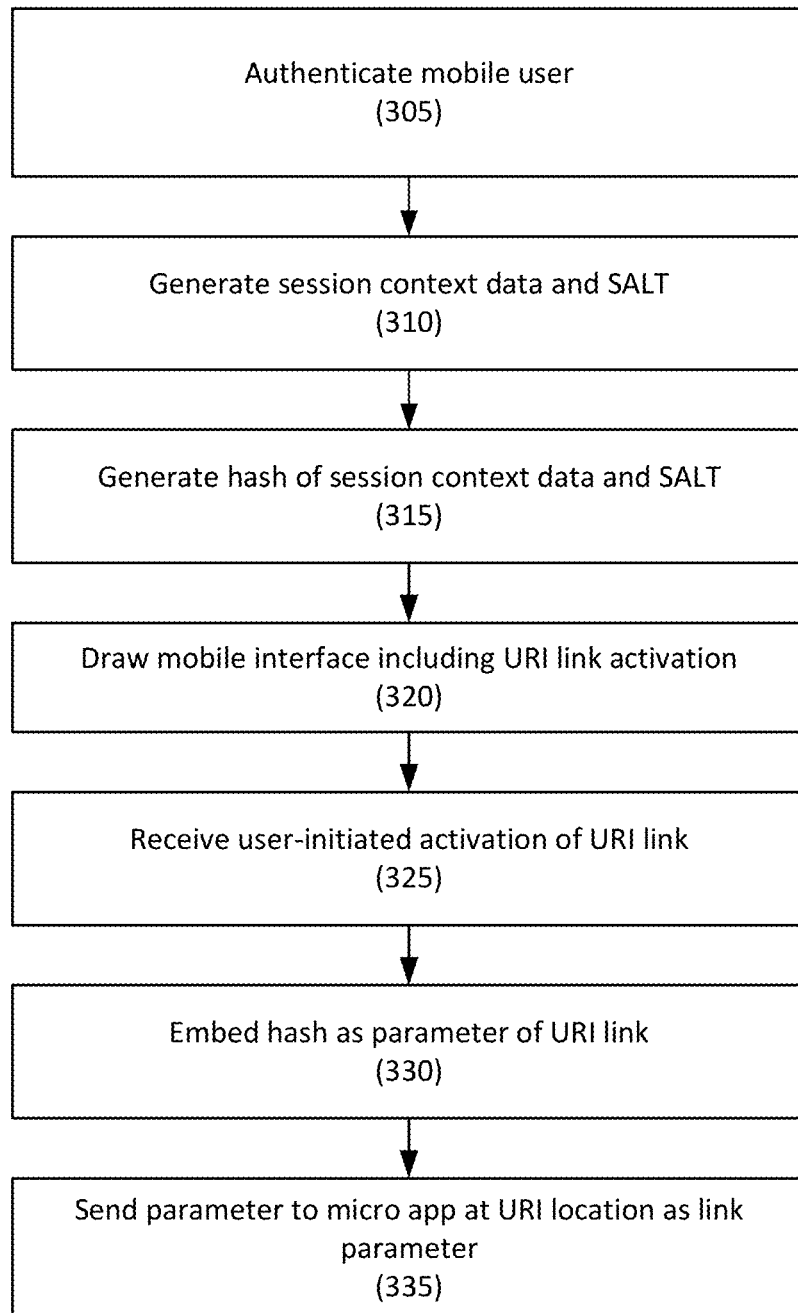
FIG. 3 is a is a logical flow for parameterizing a URI, in accordance with aspects.

FIG. 3 is a logical flow for parameterizing a URI, in accordance with aspects. At step 305, a user of a mobile app can authenticate to an authentication service for the mobile app. The authentication service can be hosted at the mobile app provider's backend processing and storage infrastructure. Authentication can include providing user credentials to the authentication services, and validation of the credentials by the authentication service. Any suitable or desirable authentication techniques can be employed, such as using username/password credentials, biometric credentials, multifactor authentication (with, e.g., a onetime passcode), etc.

At step 310, once the user is authenticated, services of the mobile provider can generate session context data based on the user's session with the mobile app provider's backend services. Session data may include a username of the user, a device identifier of the device with which the user is accessing the mobile application, approximate geographical location of the user, etc. Other exemplary session data may include demographic information, previous device identifiers, IP address(es) of a user's device, a user's phone number, a device OS version, device type, and Payment Card Industry (PCI) data for transaction processing (e.g., a tokenized account/card number, etc.).

At step 315, a hash value can be generated by processing all or part of the session context information with a hashing algorithm, as described in more detail, above. In accordance with aspects, a "salt" can be added to the session context information in order to assure randomness of the hash value. A salt, as the term is used herein, is a random value (e.g., numbers, strings, etc.) that is added to the input of a hash algorithm so that the algorithm produces a unique hash value regardless of whether the other input data is unique. A copy of the created hash value can be stored by the mobile app provider for a later comparison of a received hash value in order to authenticate the user of the mobile app.

At step 320, the mobile app interface can be displayed, including a URI link. The URI link can reference a third-party resource and the hash value can be embedded in the URI link. The third-party resource can be a direct link to a live resource, or a generic link that is processed by the mobile device's OS to determine an action. For instance, a generic link can reference the third party, and the mobile device's OS can determine if there is a mobile application of the third party installed on the user's mobile device, or if there is a micro app that can be immediately downloaded and accessed by the user.

At step 325, the mobile device can receive an activation of the link from the user of the mobile device. At step 330, the link can be parameterized with the hash value, and at step 335, the hash value can be provided to the micro application, or to the mobile device's OS, and in turn, from the OS to the micro application. An exemplary scenario can include the generation of the link including the hash value of the parameter; submission of the hash value and other link parameters (e.g., a reference to the third party) upon activation of the link to the mobile device's OS; determination, by the mobile OS of an available micro app; and launching of the micro app by the mobile OS, including passing of the hash value to the micro app.

In accordance with aspects, a user's approximate location as determined by the user's mobile device, and an IP address assigned to the user's mobile device, can be used to authenticate the mobile device user across mobile applications. Aspects can be employed with a mobile application provider's mobile application and backend systems in conjunction with a third party's mobile application and backend systems in order to share user-related data with the third party's systems. A mobile application provider and a third party may standardize an application detection data sharing scheme. The mobile app provider and the third party may be, e.g., business partners.

In accordance with aspects, a mobile app provider can provide a mobile app for its customers. The mobile app interface can include a URI link with embedded parameters. The parameters can include data that identifies the user or the user's mobile device. The parameters can also include an identifier of the third party, so that the user's mobile device can search for, install and/or launch a mobile app or micro app of the third party. Using the URI link, the identification parameters of the user can be passed to the mobile app of the third party, which, in turn, can send the parameters to the third-party's backend processing infrastructure. The third-party backend can also receive the parameters from the mobile app provider's backend, via, e.g., an external API gateway. A comparison of the parameters can verify that the device user and/or the device that activated the parameterized URI link in the mobile app provider's mobile app is the same user/device that has launched the third-party's mobile application. The URI link parameters can then be used by the third party's backend services to request data associated with the mobile user from the mobile app provider's backend services. The data can be used to complete an action provided by the third party (e.g., completing a transaction, sending merchandise, etc.)

A customer/user of the mobile app provider can launch the provider's mobile app on the user's mobile device. The customer can log into the mobile app via authentication techniques carried out by authentication services housed and executed on backend processing and storage servers of the mobile application provider. Authentication techniques can be industry standard techniques and can use multifactor authentication, biometric authentication, etc., to ensure the user's validity. Once authenticated by the mobile app provider, the mobile app can be made available for the user to access and can initiate gathering of identifying information about the user and the user's device.

Figure 4:
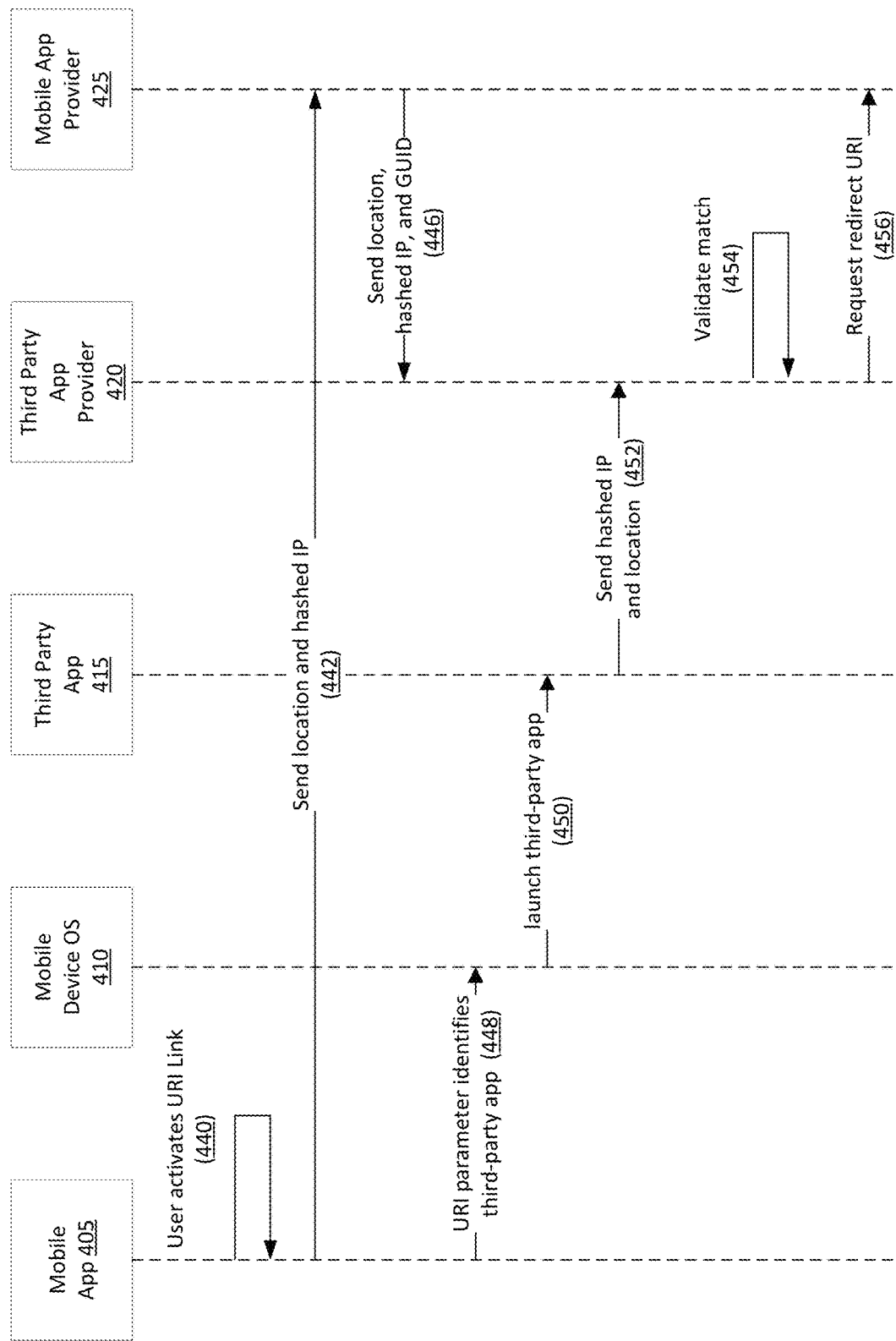
FIG. 4 is a sequence diagram for using device data to validate a mobile user, in accordance with aspects.
Figure 4:
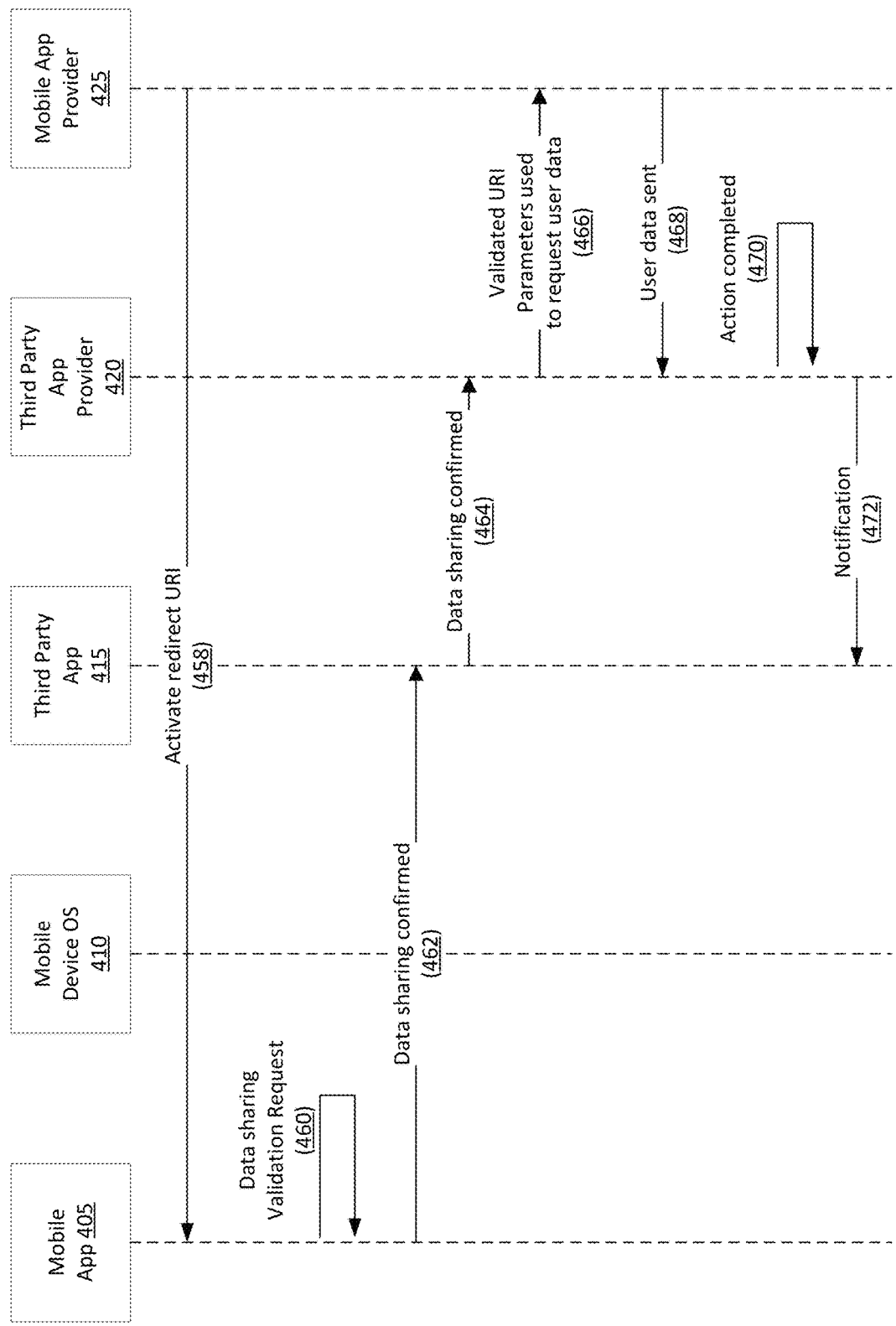

FIG. 4 is a sequence diagram for using device data to validate a mobile user, in accordance with aspects. At step 440, a user of mobile device 405 activates a URI link that is embedded in mobile app 405. The mobile app can access API interfaces of the mobile device's operating system (OS) and request the IP address that has been assigned to the device and the geographic location of the device as determined by a location services module of the mobile device OS. The location services module may interface with or include a GPS module and a GPS antenna that is configured for operative communication with GPS satellites and reports the position of the mobile device using GPS coordinates.

The mobile application can be configured to process the IP address as input data to a hashing algorithm. Hashing algorithms are discussed in more detail, above. Other identifying information can be gathered by the mobile application, such as a unique hardware device identifier of the user's device.

In accordance with aspects, the mobile app may, upon activation of the URI link by the user, request the user's permission to share data with the third party that is represented in the URI link. In other aspects, permission to share data can be received at later steps in the authentication and sharing process.

At step 442 of FIG. 4, the mobile application can be configured to communicate the identifying information to the mobile application's backend processing environment. This environment is labeled as mobile app provider 425 in FIG. 4. This may include sending the information to an application server, webserver, authentication server, database, etc., that supports the mobile application and that is operatively executing on the backend infrastructure of the mobile app provider. Mobile app provider 425's backend processing and storage servers can be configured to store the received user/device information for later comparisons that can authenticate the mobile device and/or mobile user. In accordance with aspects the location data, hashed IP address value and any other identifying information can be stored in the mobile user's profile that is associated with a user account of the mobile user. In other aspects, the identifying information can be stored in a session cache for a session with the mobile app provider's backend when the user is authenticated.

At step 446 of FIG. 4, the mobile app provider 425's backend systems can be configured to can send the identifying information to third-party app provider 420's backend systems. The identifying information can be sent via, e.g., an external API gateway, as discussed above. In addition to identifying information received from the mobile device a globally unique identifier (GUID) associated with the user can be sent to the third party's systems. In one aspect, the GUID is a one-time, or one-use, identifier that is generated at mobile app provider 425's backend system. In other aspects, mobile app 405 can generate the GUID and pass it as a parameter to the provider's back end, which can, in turn, send the GUID to third-party app provider 420's backend system.

At step 448 of FIG. 4, after activation of the URI link in mobile app 405, the URI link parameter that identifies the third party can be sent from mobile app 405 to mobile device OS 410. For instance, the URI link activated in step 440 can contain a reference to, or an identifier associated with, third-party app provider 420. Mobile device 410 can determine, based on the identifier associated with third-party app provider 420, whether third party app 415 has been installed on mobile device OS 410. If third party app 415 has been installed, mobile device OS 410 can launch third party app 415. If third party app 415 has been installed, mobile device OS 410 can launch third party app 415. If third party app 415 has not been installed, mobile device OS 410 can initiate a download and install sequence for third party app 415. In aspects where third party app 415 is a micro app, mobile device OS 410 can download and launch third party app 415 as described above.

At step 452 of FIG. 4, the identifying information can be sent from third party app 415 to third-party app provider 420. In accordance with aspects, 415 can receive the identifying information from the URI link. That is, third party app 415 can receive the hashed IP address value, the location information, and any other identifying information that is embedded as URI link parameters from the URI link. In other aspects, third party app 415 can make API calls to mobile device OS 410 as discussed above in order to retrieve the identifying information. For instance, if, at step 450, mobile device OS 410 determines that third party app 415 is installed, third party app 415 can be launched from the URI link and the parameters will remain intact and can be passed to third party app 415. If, however, mobile device OS 410 determines that third party app 415 is not installed and must be downloaded, the required downloading and installation processes may cause the link parameters to be lost, and third party app 415, once downloaded and installed, can request the IP address value and the location information, as discussed above.

At step 452 of FIG. 4, third party app 415 can send the identification information to third-party app provider 420. At step 454, third-party app provider 420 can receive the identification information, including the hashed IP address value of mobile device OS 410 and the location information from mobile device OS 410 and can use this data as lookup keys in order to determine if matching data has been received from mobile app provider 425 (at step 446). At step 456, once third-party app provider 420 verifies a match for the identification data received from third party app 415, third-party app provider 420 can send a request (e.g., an API call to an external API gateway) to mobile app provider 425 for a redirect URI. Third-party app provider 420 can send data request parameters in the redirect URI request. Mobile app provider 425, upon receiving the URI redirect request and the data request parameters, can create a redirect URI and embed the data request parameters in the redirect URI. At step 458, mobile app provider 425 can send the redirect URI to mobile app 405. The redirect URI may also include a hash value or similar security measure, which can be forwarded on to third party app 415 at step 462, to third-party app provider 420 at step 464, and ultimately back to mobile app provider 425 at step 466 for verification of the hashed value as a security measure.

In accordance with aspects, in a scenario where the user of mobile app 405 has not been authenticated, or where the user's authentication has become stale for some reason, authentication services of mobile app provider 425 may send a request that mobile app 405 resend the identifying information (e.g., the hashed IP address and the location information). Mobile app provider 425's authentication services, upon receipt of the re-sent identifying information from mobile app 405 can compare the received information with the stored information (as received in step 442) and determine that the sets of identifying information match in order to re-authenticate the user/device. If the user's authentication is still valid, mobile app provider 425 can send the redirect URI without re-authentication.

Upon receiving the redirect URI and at step 460 of FIG. 4, mobile app 405 can regain focus on the user's device (i.e., can be displayed on the device interface) and display a data sharing validation request. The data sharing validation request can include indications of what data third-party app provider 420 is requesting. This data can be indicated in the data request parameters embedded in the received URI. For example, the data sharing request can indicate that payment account details that are stored by mobile app provider 425 have been requested in order to compete a transaction that was offered in associated with the URI link. The data sharing request may also indicate that the user's name and address are requested by third-party app provider 420 so that, e.g., merchandise purchased via a transaction can be shipped to the user's residence. In accordance with aspects, any data stored by mobile app provider 425 can be requested from third-party app provider 420.

At step 462 of FIG. 4, mobile app 405 can send the data sharing validation confirmation to third party app 415, which can, in turn, send the validation to third-party app provider 420 at step 464. At step 466, 420 can use the validated URI parameters to request the user data indicated in the parameter from mobile app provider 425. Mobile app provider 425 can send the requested user data to third-party app provider 420 at step 468. Third-party app provider 420 can complete the action indicated to the user at step 470, and send a notification to the user at step 472.

Figure 5:
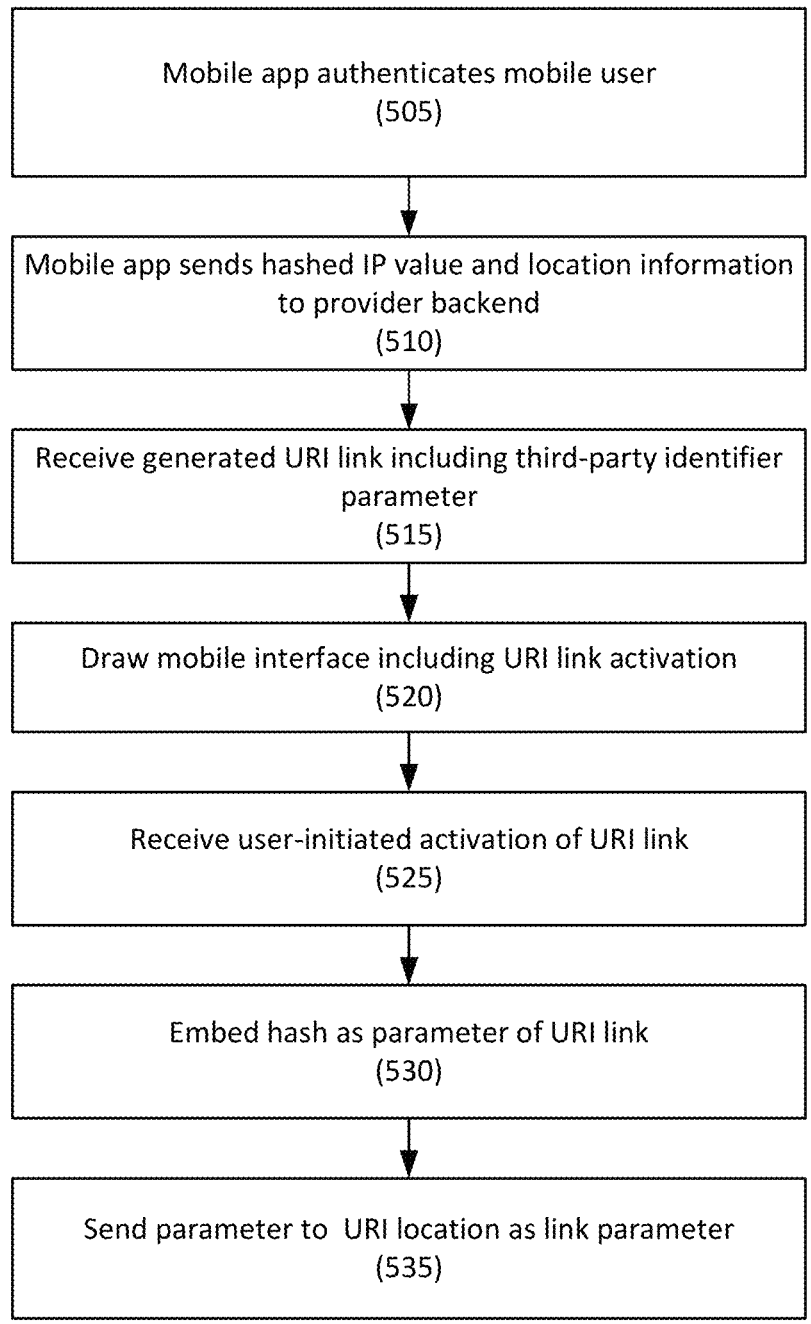
FIG. 5 is a is a logical flow for providing device identifiers from a mobile application, in accordance with aspects.

FIG. 5 is a logical flow for providing device identifiers from a mobile application, in accordance with aspects. At step 505, a mobile app can initiate a user authentication. The user authentication can be performed in conjunction with the mobile app provider's backend authentication services, as discussed above. At step 510, the mobile app sends a hashed IP address value and hashed location information to the mobile app provider's backend. At step 515, the mobile app provider can generate and provide, and the mobile app can receive, a URI link including a third-party identifier parameter. At step 520, the mobile app can draw the graphical user interface of the mobile app including a user-selectable URI link. The link can be in the form of a hyperlinked button, hyperlinked text, etc. The URI can be activated upon a user selection (e.g., touching or clicking) of the URI. At step 525, the mobile app can receive the user's activation of the URI link. At step 530, the mobile app can embed the hashed values as parameters of the URI link. At step 535, the mobile app can send the parameter values to a micro app, a conventional app, or another location as specified in the URI as link parameters.

In accordance with aspects, an iFrame can be used in the context of a mobile application as a technique for embedding a traditional webpage within a mobile application and incorporating webpage functionality for use with a mobile application. An iFrame can utilize the same browser engine that drives a traditional browser interface (i.e., a stand-alone browser window), and therefore has access to the same local browser cache and functionality for executing scripting languages such as JavaScript. Accordingly, an iFrame that is embedded in a mobile application can access stored cookies in a local browser cache, can be directed to a particular webserver and can be configured with parameterized URLs to pass information to a website via the HTTP protocol. By programmatically adjusting size parameters of an iFrame that is embedded in a mobile application, the iFrame can be made transparent to the mobile application user. That is, the iFrame can be hidden, yet still access websites/servers in the background without the user observing the iFrame (e.g., a visual window) or a web page being loaded.

In accordance with aspects, a hidden iFrame can be used to observe and transmit data stored in a cookie that is, in turn, stored in a local browser cache, and use the data from the cookie to verify that a browser is a known browser to a particular web server. A user can be authenticated to a mobile app provider's mobile application and/or the mobile app provider's backend as described above. Upon authentication, a webserver executing on the backend infrastructure of the mobile application provider can place a cookie in the local browser cache of a browser loaded on the user's mobile electronic device. The generation and sending of the cookie to the local browser cache may be initiated by a hidden iFrame on the mobile app provider's mobile application. That is, an iFrame on the mobile application can send a request to the webserver, requesting information, and the webserver can respond with the information and write it to a cookie (i.e., a text file) that is stored in a local cache accessible to a local browser on the mobile device. In other aspects, the mobile application may prompt the webserver to generate and place the cookie in the local browser cache on the user's local device.

The cookie can contain an identifier that is related to the user's account on the mobile app provider's authentication system/server. The identifier can be a globally unique identifier (a "GUID"). The identifier can be an arbitrary string but can be generated from data that is unique to the user's account. For instance, the identifier can be a value created from a one-way function (i.e., a hash value from a hashing algorithm), where the input to the hashing algorithm includes a unique piece of information from the user's account. The identifier can also be saved at the mobile app provider's backend and can be associated with the user's account/profile for later lookup and/or reference.

In some aspects, input to a hashing algorithm may include multiple pieces of information/data associated with the user's account, where at least one input is unique to the user. The cookie may also contain other information, such as context information from the server session, other user information, etc. The cookie may be a session cookie that expires and is deleted after the session ends, or after a pre-determined amount of time (e.g., a day, a week, a month, etc.). Or the cookie may be a permanent cookie that is persisted in the cache until the user deletes it.

A third-party mobile application or website can access the information in the cookie by launching a hidden iFrame with a URL that is pointed to the mobile application provider's website. Since the iFrame is opened in the mobile application provider's domain, it will be able to access/read the cookie saved in the browser cache of the mobile device by the webserver of the mobile application provider. The URL of the iFrame can include the user identifier as a parameter that is passed to the webserver of the mobile app provider. Upon receiving the user identifier passed to it by the URL of the iFrame, the mobile app provider's webserver can determine that a cooking including the user identifier is present in the browser cache of the user's mobile device. This signifies that the user has authenticated from the mobile application to the mobile app provider's authentication system/server.

The webserver of the mobile app provider may then respond to the request from the iFrame with an indication that the browser is a known to the webserver based on a verification of the cookie containing the user identifier being present on the user's mobile device. The iFrame can pass this response on to a parent browser window or to the third party's mobile application from where the iFrame was launched. A scripting language (such as JavaScript) may be used to pass this information from the iFrame to a parent window and/or directly to the third-party mobile application. A parent window of the iFrame may then utilize additional scripts to pass the user identifier to the third party's backed systems, or the third party's mobile application may be configured to send the user identifier to the third party's backend systems, in other aspects. In some aspects, a parent browser window of the iFrame may be configured to pass the identifier to the third-party mobile application, and the third-party mobile application may then be configured to pass the user identifier to the third party's backend systems.

Once received at the backend processing systems of the third party, the user identifier can be sent, via an API call, to the mobile app providers backend systems. For example, the third-party's backed systems may make an API call to the mobile app provider's backend systems via an external API gateway exposed from the mobile app provider's backend systems. The API call may also request information (in some aspects, sensitive user information, such as payment product details) associated with the user. The mobile app provider's backend systems can use the received user identifier to as a key to lookup the user account/profile and send the information to the third party's backend systems. In this way, user information can be sent via secured API channels, and insecure browser channels can be avoided. The requested user information can be used to complete actions, fulfill offers, etc., as discussed in more detail, above.

Figure 6:
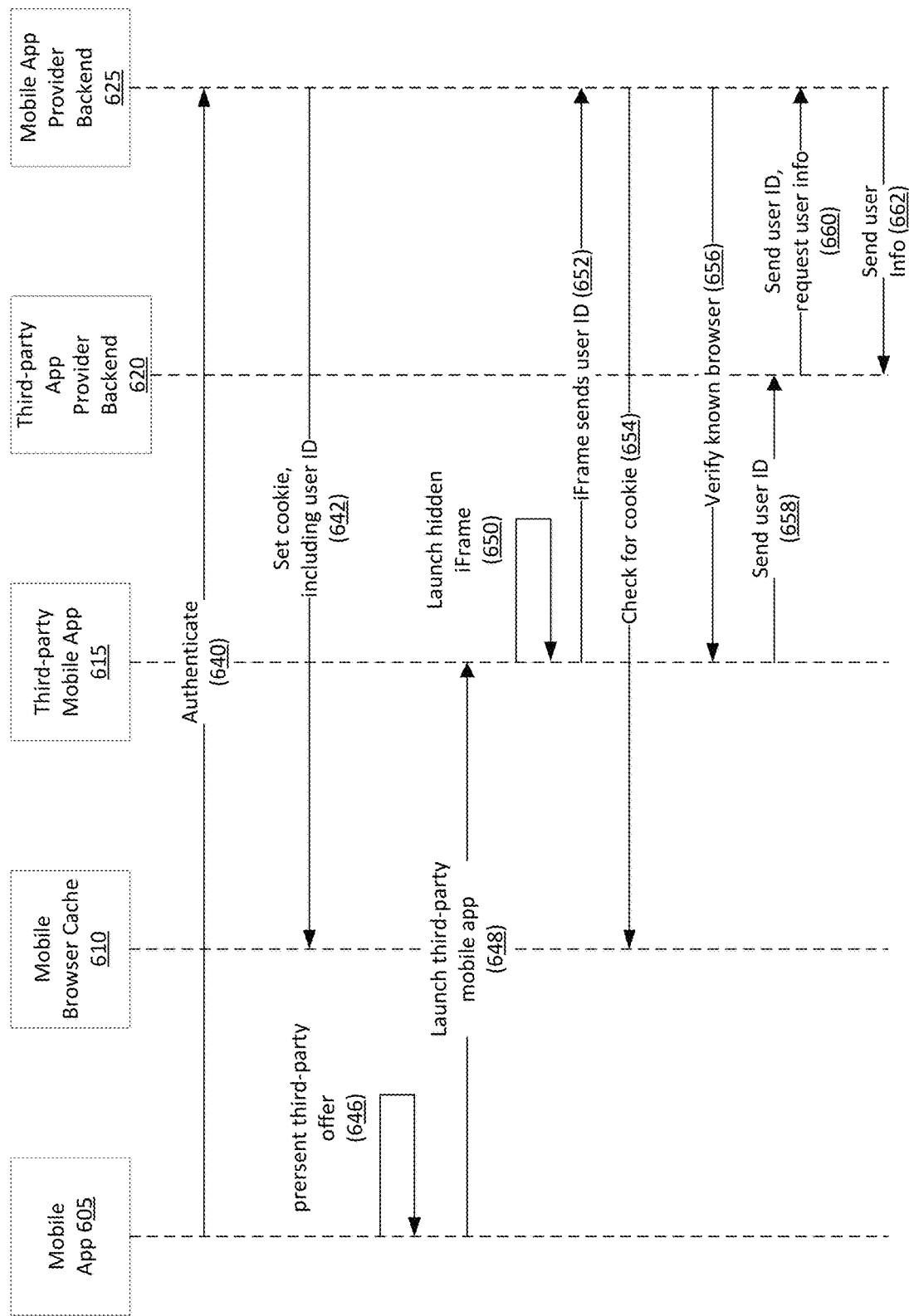
FIG. 6 is a sequence diagram for providing verified communication between mobile applications using iFrames, in accordance with aspects.

FIG. 6 is a sequence diagram for facilitating verified data transfers between mobile applications using iFrames, in accordance with aspects. At step 640 mobile app 605, provided by a mobile application provider, can send authentication credentials input by a user to a mobile app provider backend 625. Mobile app provider backend 625 can include an authentication service that authenticates the user of mobile app 605. Upon authentication, mobile app provider backend 625 can set a cookie in browser cache 610 of the user's mobile device. The cookie can include a user identifier, as described above.

At step 646 of FIG. 6, mobile app 605 can present a third-party offer within mobile app 605. The third-party offer can be presented as a selectable feature (e.g., a button) including a URI that launches third-party mobile app 615 on the user's mobile device. Third-party mobile app 615 can be a mobile application provided by the third party associated with the third-party offer. Upon selection of the selectable feature by the user, the URI can be activated and third-party mobile app 615 can be launched on the user's mobile device. In some aspects, third-party mobile app 615 may not yet be downloaded to the user's mobile device, and step 648 includes downloading third-party mobile app 615. Downloading and launching of third-party mobile apps on a user's mobile device is also described above with reference to other aspects, and the same or similar techniques may be used.

At step 650 of FIG. 6, third-party mobile app 615 can launch a hidden iFrame, the hidden iFrame can be launched in the mobile app provider's domain, so that it can access the cookie set by mobile app provider backend 625 that includes the user identifier. The iFrame can send the URL to mobile app provider backend 625 via a parameterized URL to, e.g., a webserver hosted thereon. At step 654, mobile app provider backend 625 can determine that the cookie, including the user identifier, is present in browser cache 610. At step 656, mobile app provider backend 625 can respond to the iFrame embedded in third-party mobile app 615 with a verification that the browser and the user is known and has authenticated to mobile app provider backend 625.

Upon receiving verification that the user has authenticated to mobile app provider backend 625 and that the browser is a known browser, third-party mobile app 615 can send the user identifier to third-party app provider backend 620 at step 658. The iFrame can execute a script to pass the user identifier to third-party app provider backend 620. The script may pass the user identifier first to third-party mobile app 615, which may, in turn, pass the user identifier to third-party app provider backend 620. In other aspects, the iFrame may utilize an executable script to first pass the user identifier to a parent browser window or a parent iFrame, then to third-party mobile app 615, which may pass the user identifier, in turn, to third-party app provider backend 620.

Third-party app provider backend 620 may then make an API call, at step 660, to mobile app provider backend 625, including the user identifier and a request for user information associated with the user. The user identifier and the request for user information can be passed through an API gateway exposed by mobile app provider backend 625. After receiving the user identifier and the request for user information, mobile app provider backend 625 can use the user identifier as a key to lookup the user account associated with the user identifier and provide the requested user information to third-party app provider backend 620 at step 662.

Aspects described herein are related and steps disclosed above and/or from one or more of the accompanying figures may be used, without limitation, in one or more other logical flows presented herein. For example, additional steps not shown in FIG. 6, but applicable to aspects described with respect to FIG. 6 and discussed in detail, above, may involve third-party app provider backend 620 and/or third-party mobile app 615 facilitating an action or offer from the third party using the user information. It is contemplated that, where steps from various figures and other portions of the disclosure are complementary of, or lend themselves to inclusion in, the various aspects described herein, that these steps may be incorporated in such aspects without limitation.

Figure 7:
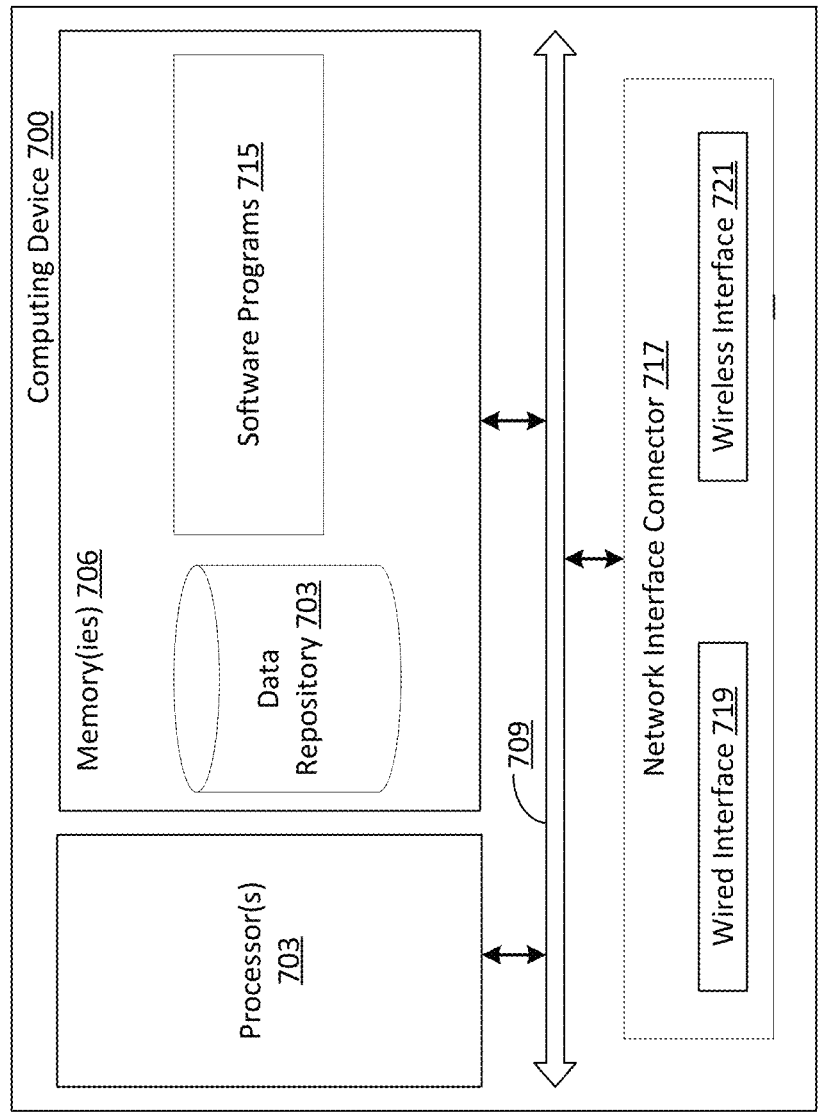
FIG. 7 is a block diagram of a computing device, in accordance with aspects.

FIG. 7 is a block diagram of a computing device for implementing certain aspects of the present disclosure. FIG. 7 depicts exemplary computing device 700. Computing device 700 may represent hardware components and a configuration included in one or more of the servers, computers, mobile devices, backend processing devices, or other electronic devices disclosed herein, in accordance with aspects. Computing device 700 includes a processor 703 coupled to a memory 706. The processor 703 executes computer-executable program code stored in memory 706, such as software programs 715. Software programs 715 may include one or more of the logical steps disclosed herein as a programmatic instruction, which can be executed by processor 703. The processor 703 and the memory 706 may be coupled by a bus 709. In some examples, the bus 709 may also be coupled to one or more network interface connectors 717, such as wired network interface 719, and/or wireless network interface 721. Computing device 700 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some or all of the steps shown in the depicted logical flow diagrams. Some steps may be performed simultaneously. Accordingly, the logical flows illustrated in the figures and described in greater detail herein are meant be exemplary and, as such, should not be viewed as limiting. These logical flows may be implemented in the form of executable instructions stored on a machine-readable storage medium and/or in the form of electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory.

The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, aspects of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications or equivalent arrangements.

The invention claimed is:

1. A method, comprising:
   authenticating user credentials with a backend processing infrastructure of a provider of a mobile application, wherein the authenticating generates session information;
   receiving, at the mobile application, a uniform resource identifier (URI), wherein the URI includes the session information as a parameter of the URI;
   receiving, at the mobile application, a user-activation of the URI;
   receiving, at the backend processing infrastructure of the provider of the mobile application and from a backend processing infrastructure of a third party, the session information;
   verifying, by the backend processing infrastructure of the provider of the mobile application the session information; and
   sending, by the backend processing infrastructure of the provider of the mobile application and to the backend processing infrastructure of the third party, requested user information.

2. The method of claim 1, wherein the URI includes a third-party identifier as a second parameter of the URI, wherein the third party identifier identifies the third party.

3. The method of claim 2, wherein the mobile application sends the third-party identifier to a mobile device operating system.

4. The method of claim 3, wherein the mobile device operating system downloads and launches a micro-application provided by the third party.

5. The method of claim 4, further comprising:
   completing, by the backend processing infrastructure of the third party, an action using the requested information.

6. The method of claim 5, further comprising:
   sending, by the backend processing infrastructure of the third party, a notification to the micro-application, wherein the notification indicates that the action has been completed.

7. The method of claim 1, wherein the session information includes a username.

8. The method of claim 1, wherein the requested user information includes an address associated with the user credentials.

9. The method of claim 1, wherein the requested user information includes payment information associated with the user credentials.

10. The method of claim 1, wherein the session information is received by the backend processing infrastructure of the provider of the mobile application via an API call to an external API gateway exposed by the backend processing infrastructure of the provider of the mobile application.

11. The method of claim 1, wherein the session information is hashed.

12. The method of claim 11, wherein the session information is hashed using a SHA-2 algorithm.

13. A non-transitory computer readable storage medium, including instructions stored thereon, which when read and executed by one or more computers cause the one or more computers to perform steps comprising:
- authenticating user credentials with a backend processing infrastructure of a provider of a mobile application, wherein the authenticating generates session information;
- receiving, at the mobile application, a uniform resource identifier (URI), wherein the URI includes the session information as a parameter of the URI;
- receiving, at the mobile application, a user-activation of the URI;
- receiving, at the backend processing infrastructure of the provider of the mobile application and from a backend processing infrastructure of a third party, the session information;
- verifying, by the backend processing infrastructure of the provider of the mobile application the session information; and
- sending, by the backend processing infrastructure of the provider of the mobile application and to the backend processing infrastructure of the third party, requested user information.

14. The non-transitory computer readable storage medium of claim 13, wherein the URI includes a third-party identifier as a second parameter of the URI, wherein the third party identifier identifies the third party.

15. The non-transitory computer readable storage medium of claim 13, wherein the mobile application sends the third-party identifier to a mobile device operating system.

16. The non-transitory computer readable storage medium of claim 13, wherein the session information includes a username.

17. The non-transitory computer readable storage medium of claim 13, wherein the requested user information includes an address associated with the user credentials.

18. The non-transitory computer readable storage medium of claim 13, wherein the requested user information includes payment information associated with the user credentials.

19. The non-transitory computer readable storage medium of claim 13, wherein the session information is received by the backend processing infrastructure of the provider of the mobile application via an API call to an external API gateway exposed by the backend processing infrastructure of the provider of the mobile application.

20. A system comprising:
- a backend processing infrastructure of a provider of a mobile application; and
- a mobile device that executes the mobile application;
- wherein the backend processing infrastructure of the provider of the mobile application is configured to authenticate user credentials, and wherein the authentication of the user credentials generates session information;
- wherein the mobile application is configured to:
  - receive a uniform resource identifier (URI), wherein the URI includes the session information as a parameter of the URI;
  - receive a user-activation of the URI; and
- wherein the backend processing infrastructure of the provider of the mobile application is further configured to:
  - receive, from a backend processing infrastructure of a third party, the session information;
  - verify the session information; and
  - send, to the backend processing infrastructure of the third party, requested user information.

* * * * *